(12) United States Patent
Ma et al.

(10) Patent No.: US 10,009,672 B2
(45) Date of Patent: Jun. 26, 2018

(54) OPTICAL TRANSMISSION SYSTEM AND TRANSMISSION METHOD, OPTICAL SWITCHING APPARATUS, AND CONTROL METHOD

(71) Applicant: HUAWEI TECHNOLOGIES CO., LTD., Shenzhen, Guangdong (CN)

(72) Inventors: Huixiao Ma, Shenzhen (CN); Xiaoling Yang, Shenzhen (CN); Shuaibing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/293,989

(22) Filed: Oct. 14, 2016

(65) Prior Publication Data
US 2017/0034606 A1 Feb. 2, 2017

Related U.S. Application Data

(63) Continuation of application No. PCT/CN2014/089467, filed on Oct. 24, 2014.

(30) Foreign Application Priority Data

Apr. 16, 2014 (CN) .......................... 2014 1 0152709

(51) Int. Cl.
*H04Q 11/00* (2006.01)
*H04L 12/18* (2006.01)
*H04L 12/723* (2013.01)

(52) U.S. Cl.
CPC ......... *H04Q 11/0066* (2013.01); *H04L 12/18* (2013.01); *H04L 45/50* (2013.01);
(Continued)

(58) Field of Classification Search
CPC .................................................. H04Q 11/0066
See application file for complete search history.

(56) References Cited

U.S. PATENT DOCUMENTS

2002/0071152 A1* 6/2002 Blumenthal ........ H04J 14/0298
398/43
2003/0198471 A1 10/2003 Ovadia
(Continued)

FOREIGN PATENT DOCUMENTS

| CN | 101426152 | 5/2009 |
|---|---|---|
| CN | 101877800 | 11/2010 |

(Continued)

OTHER PUBLICATIONS

International Search Report, dated Jan. 26, 2015, in corresponding International Patent Application No. PCT/CN2014/089467.
(Continued)

*Primary Examiner* — Shi K Li
(74) *Attorney, Agent, or Firm* — Staas & Halsey LLP

(57) ABSTRACT

An optical transmission system and transmission method, an optical switching apparatus, and a control method are provided. Any data transmission apparatus included in an optical transmission system is configured to: transmit an optical label signal and a continuous data signal including an idle sequence and a data packet, and transmit the transmitted optical label signal to an optical switching apparatus, so that the optical switching apparatus builds, according to the optical label signal, a switching and transmission path for transmitting the continuous data signal transmitted by the any data transmission apparatus. This ensures that a data transmission apparatus transmits a continuous data signal, and also ensures that each optical receiving system can receive the continuous data signal. Therefore, no preamble needs to be added before a data packet carried in a to-be-
(Continued)

processed data signal, thereby avoiding a resource waste and saving bandwidth resources.

17 Claims, 13 Drawing Sheets

(52) U.S. Cl.
CPC ..... *H04Q 11/0005* (2013.01); *H04Q 11/0062* (2013.01); *H04Q 2011/0039* (2013.01); *H04Q 2011/0058* (2013.01); *H04Q 2011/0077* (2013.01)

(56) References Cited

U.S. PATENT DOCUMENTS

| | | | |
|---|---|---|---|
| 2005/0089327 A1* | 4/2005 | Ovadia | H04L 45/04 398/47 |
| 2009/0327797 A1 | 12/2009 | Wei | |
| 2010/0008373 A1 | 1/2010 | Xiao et al. | |

FOREIGN PATENT DOCUMENTS

| | | |
|---|---|---|
| CN | 202121601 | 1/2012 |
| CN | 102355609 | 2/2012 |
| CN | 102882811 | 1/2013 |
| CN | 103609083 | 2/2014 |
| EP | 2988442 | 2/2016 |
| WO | 2003/050708 | 6/2003 |
| WO | 2005/043843 | 5/2005 |

OTHER PUBLICATIONS

Written Opinion of the International Searching Authority dated Jan. 26, 2015 in corresponding International Patent Application No. PCT/CN2014/089467.

Notification of Transmittal of International Search Report and Written Opinion of the International Search Authority dated Jan. 26, 2015 in corresponding International Patent Application No. PCT/CN2014/089467.

Extended European Search Report, dated Mar. 24, 2017, in European Patent Application No. 14889759.8.

International Search Report, dated Jan. 26, 2015, in corresponding International Application No. PCT/CN2014/089467 (6 pp.).

* cited by examiner

OPTICAL TRANSMISSION SYSTEM AND TRANSMISSION METHOD, OPTICAL SWITCHING APPARATUS, AND CONTROL METHOD

CROSS-REFERENCE TO RELATED APPLICATIONS

This application is a continuation of International Application No. PCT/CN2014/089467, filed on Oct. 24, 2014, which claims priority to Chinese Patent Application No. 201410152709.3, filed on Apr. 16, 2014, The disclosures of the aforementioned applications are hereby incorporated by reference in their entireties.

TECHNICAL FIELD

The present invention relates to the field of communications technologies, and in particular, to an optical transmission system and transmission method, an optical switching apparatus, and a control method.

BACKGROUND

As requirements for large-bandwidth services grow increasingly, a larger switching capacity is also required for a switching network. However, due to limitations of technologies for backplanes, energy consumption, and the like, a traditional electric switch cannot meet a requirement for an ever-increasing switching capacity. An optical switch receives widespread attention for its low power consumption, high capacity, and other characteristics.

Currently, an optical switching system usually uses a burst-mode transmission mechanism to transmit an optical signal, that is, there is a spacing between data packets carried in the optical signal. Therefore, a burst signal is generated. FIG. 1A shows a burst signal. Because amplitudes between burst signals differ greatly, when receiving optical signals, an optical receiving system needs to adjust a parameter such as a gain proportion according to a power peak value of each optical signal, so that the optical signals of different strengths are converted into electrical signals of a same strength, thereby ensuring that the optical receiving system can receive the optical signals successfully.

Currently, a common practice of processing a burst signal by an optical receiving system in the industry is: adding a preamble before a data packet carried in each optical signal, to adjust a status of an optical receiver, as shown in FIG. 1B. However, an adjustment process usually requires hundreds of nanoseconds or a few microseconds; as a power value difference between optical data signals and a data transmission rate increase, the adjustment process is prolonged, and a preamble that needs to be added extends correspondingly, causing a disadvantage of resource waste. According to the Ethernet protocol, an Ethernet data frame length ranges from 64 B to 1510 B. In an example of the 10 G Ethernet, a shortest packet requires 50 ns, and if a preamble that requires tens of nanoseconds is added, a waste of about 50% bandwidth is caused.

SUMMARY

Embodiments of the present invention provide an optical transmission system and transmission method, a switching apparatus, and a control method, so as to overcome a prior-art disadvantage of resource waste.

The specific technical solutions provided in the embodiments of the present invention are as follows:

According to a first aspect, an optical transmission system is provided, including at least two data transmission apparatuses, where any one of the data transmission apparatuses is configured to: transmit an optical label signal and a continuous data signal including an idle sequence and a data packet, and transmit the transmitted optical label signal to an optical switching apparatus, so that the optical switching apparatus builds, according to the optical label signal, a switching and transmission path for transmitting the continuous data signal transmitted by the any one of the data transmission apparatuses, where any optical label carried in the optical label signal corresponds to one data packet in the data signal, and switching and transmission paths corresponding to data signals transmitted by the any two different data transmission apparatuses have different output ports.

With reference to the first aspect, in a first possible implementation manner, any one of the data transmission apparatuses includes an optical label transmission module, a data packet transmission module, and an idle sequence transmission module, where the optical label transmission module is configured to transmit an optical label;

the data packet transmission module is configured to transmit a data packet; and the idle sequence transmission module is configured to transmit an idle sequence between any optical label and any data packet that are adjacent.

With reference to the first aspect or the first possible implementation manner of the first aspect, in a second possible implementation manner, the optical label transmission module is further configured to:

generate an optical label, where any optical label includes a preset switching destination output port address, a data length, and an optical label identifier.

According to a second aspect, an optical transmission system is provided, including at least one optical packet transmission apparatus and at least one optical label transmission apparatus, where any optical packet transmission apparatus is configured to transmit a continuous data signal including an idle sequence and a data packet; and any optical label transmission apparatus is configured to: transmit an optical label signal, and transmit the optical label signal to an optical switching apparatus, so that the optical switching apparatus builds, according to the optical label signal, a switching and transmission path for transmitting a continuous data signal transmitted by a corresponding optical packet transmission apparatus, where any optical label carried in the optical label signal corresponds to one data packet in the corresponding data signal, and switching and transmission paths corresponding to data signals transmitted by the any two different optical packet transmission apparatuses have different output ports.

With reference to the second aspect, in a first possible implementation manner, any optical packet transmission apparatus includes a data packet transmission module and an idle sequence transmission module, where the data packet transmission module is configured to transmit a data packet; and the idle sequence transmission module is configured to transmit an idle sequence between any two adjacent data packets.

With reference to the second aspect or the first possible implementation manner of the second aspect, in a second possible implementation manner, the optical label transmission apparatus is further configured to:

generate an optical label, where any optical label includes a preset switching destination output port address, a data length, and an optical label identifier.

According to a third aspect, an optical switching apparatus is provided, including a management and control module and an optical switch matrix, where the management and control module is configured to: receive an optical label signal transmitted by an optical transmission system, and transmit, to the optical switch matrix, a control signal generated according to the optical label signal; and the optical switch matrix is configured to: receive a continuous data signal transmitted by the optical transmission system and the control signal; adjust, according to the control signal, an optical switch unit on a link between each input port for data signal input and a corresponding output port for data signal output, to build a switching and transmission path for transmitting the continuous data signal; and input the any data signal to an optical receiving system through the switching and transmission path, where any two different switching and transmission paths have different input ports and output ports.

With reference to the third aspect, in a first possible implementation manner, each optical label carried in the optical label signal received by the management and control module includes a preset switching destination output port address, a data length, and an optical label identifier.

With reference to the third aspect or the first possible implementation manner of the third aspect, in a second possible implementation manner, the management and control module is specifically configured to:

determine, according to a preset switching destination output port address included in a corresponding optical label, an actual switching destination output port address corresponding to each data packet carried in a continuous data signal;

allocate, for each idle sequence, an output port address corresponding to an idle output port, and use the output port address as an actual switching destination output port address corresponding to the idle sequence; and perform the following operations separately with respect to any data packet and any idle sequence:

generating, according to an input port address and an actual switching destination output port address, a control signal for controlling a switch unit on a link between an input port corresponding to the input port address and an output port corresponding to the actual switching destination output port address; and transmitting the generated control signal to the optical switch matrix.

With reference to the third possible implementation manner of the third aspect, in a fourth possible implementation manner, the management and control module is further configured to:

calculate, with respect to any optical label in the received optical label signal and according to a data packet length included in the any optical label, a time required for transmitting a corresponding data packet; and determine, according to the time, a validity time of a control signal for controlling a switching and transmission path for the data packet corresponding to the optical label.

With reference to the third aspect or the first to fourth possible implementation manners of the third aspect, in a fifth possible implementation manner, the optical switch matrix is specifically configured to:

perform the following operations separately with respect to a control signal corresponding to any data signal:

controlling a switch unit on a link between an input port and an actual switching destination output port that are corresponding to the data signal, and connecting the input port to the actual switching destination output port to build a switching and transmission path for transmitting the any data signal; and inputting the any data signal to the optical receiving system through the switching and transmission path.

With reference to the third aspect or the first to fifth possible implementation manners of the third aspect, in a sixth possible implementation manner, the management and control module is specifically configured to:

perform the following operations separately with respect to a data packet corresponding to any optical label:

determining whether the data packet meets a preset condition; and if yes, using, as an actual switching destination output port address, a preset switching destination output port address included in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

With reference to the sixth possible implementation manner of the third aspect, in a seventh possible implementation manner, the determining, by the management and control module, whether the any data packet meets a preset condition is specifically:

determining whether the optical label corresponding to the data packet is correct and/or whether the corresponding preset switching destination output port address is occupied.

With reference to the sixth or seventh possible implementation manner of the third aspect, in an eighth possible implementation manner, the management and control module is specifically configured to:

use, with respect to an idle sequence, the any switching output port in the determined idle switching output port as an actual switching destination output port address of the idle sequence, and generate a control signal according to the actual switching destination output port address.

With reference to the sixth to eighth possible implementation manners of the third aspect, in a ninth possible implementation manner, the management and control module is specifically configured to:

if any two different data packets arrive at the optical switch matrix simultaneously, and preset switching destination output port addresses corresponding to the two data packets respectively are the same and unoccupied, use a preset switching destination output port address corresponding to one data packet as a first actual switching destination output port address of the data packet and use a determined idle switching output port address as a second actual switching destination output port address of the other data packet; and generate a control signal according to the first actual switching destination output port address and the second actual switching destination output port address.

With reference to the third aspect or the first to ninth possible implementation manners of the third aspect, in a tenth possible implementation manner, the management and control module is further configured to:

separately calculate a first power attenuation value after each data packet included in the continuous data signal passes through a corresponding switching and transmission path, and/or a second power attenuation value of an optical switch unit on the corresponding switching and transmission path; and calculate a total power attenuation value according to the first power attenuation value and/or the second power attenuation value, and transmit the total power attenuation value to a power equilibrium unit, so that the power equilibrium unit performs power compensation before a data packet is input to the optical receiving system through a corresponding actual switching destination output port.

With reference to the tenth possible implementation manner of the third aspect, in an eleventh possible implementation manner, the optical switching apparatus further includes the power equilibrium unit, configured to perform power compensation before a data packet is input to the optical receiving system through a corresponding actual switching destination output port.

According to a fourth aspect, an optical receiving system is provided, including an optical receiver and a processor, where each optical receiver is configured to receive a continuous data signal transmitted by an optical transmission system; and the processor is configured to process a data packet in the received continuous data signal.

According to a fifth aspect, an optical switching system is provided, including:

the optical transmission system according to the first aspect and the second aspect, the optical switching apparatus according to the third aspect, and the optical receiving system according to the fourth aspect.

According to a sixth aspect, a method for transmitting light by an optical transmission system is provided, including:

transmitting an optical label signal and a continuous data signal including an idle sequence and a data packet, and transmitting the transmitted optical label signal to an optical switching apparatus, so that the optical switching apparatus builds, according to the optical label signal, a switching and transmission path for transmitting a continuous data signal transmitted by the any one of the data transmission apparatuses, where any optical label carried in the optical label signal corresponds to one data packet in the data signal, and switching and transmission paths corresponding to data signals transmitted by the any two different data transmission apparatuses have different output ports.

According to the sixth aspect, in a first possible implementation manner, if the optical label signal and the continuous data signal are transmitted in an in-band transmission manner, an idle sequence is between any optical label and an adjacent data packet; or if the optical label signal and the continuous data signal are transmitted in an out-of-band transmission manner, an idle sequence is between any two adjacent data packets.

With reference to the sixth aspect or the first possible implementation manner of the sixth aspect, in a second possible implementation manner, before the transmitting an optical label signal, the method further includes:

generating an optical label, where any optical label includes a preset switching destination output port address, a data length, and an optical label identifier.

According to a seventh aspect, a control method is provided, including:

receiving an optical label signal and a continuous data signal that are transmitted by an optical transmission system;

generating a control signal according to the optical label signal;

adjusting, according to the control signal, an optical switch on a link between each input port for data signal input and a corresponding output port for data signal output, to build a switching and transmission path for transmitting the continuous data signal; and inputting the any data signal to an optical receiving system through the switching and transmission path, where any two different switching and transmission paths have different input ports and output ports.

With reference to the seventh aspect, in a first possible implementation manner, each optical label carried in the optical label signal includes a preset switching destination output port address, a data length, and an optical label identifier.

With reference to the seventh aspect or the first possible implementation manner of the seventh aspect, in a second possible implementation manner, the generating a control signal according to the optical label signal specifically includes:

determining, according to a preset switching destination output port address included in a corresponding optical label, an actual switching destination output port address corresponding to each data packet carried in a continuous data signal;

allocating, for each idle sequence, an output port address corresponding to an idle output port, and using the output port address as an actual switching destination output port address corresponding to the idle sequence; and performing the following operation with respect to any data packet and any idle sequence:

generating, according to an input port address and an actual switching destination output port address, a control signal for controlling a switch unit on a link between an input port corresponding to the input port address and an output port corresponding to the actual switching destination output port address.

With reference to the second possible implementation manner of the seventh aspect, in a third possible implementation manner, after the generating a control signal for controlling a switch unit on a link between an input port corresponding to the input port address and an output port corresponding to the actual switching destination output port address, the method further includes:

calculating, with respect to any optical label in the received optical label signal and according to a data packet length included in the any optical label, a time required for transmitting a corresponding data packet; and determining, according to the time, a validity time of a control signal for controlling a switching and transmission path for the data packet corresponding to the optical label.

With reference to the seventh aspect or the first to third possible implementation manners of the seventh aspect, in a fourth possible implementation manner, the adjusting, according to the control signal, an optical switch on a link between each input port for data signal input and a corresponding output port for data signal output, to build a switching and transmission path for transmitting the continuous data signal specifically includes:

performing the following operations separately with respect to a control signal corresponding to any data signal:

controlling a switch unit on a link between an input port and an actual switching destination output port that are corresponding to the data signal, and connecting the input port to the actual switching destination output port to build a switching and transmission path for transmitting the any data signal.

With reference to the seventh aspect or the first to fourth possible implementation manners of the seventh aspect, in a fifth possible implementation manner, the generating a control signal according to the optical label signal specifically includes:

performing the following operations separately with respect to a data packet corresponding to any optical label:

determining whether the data packet meets a preset condition; and if yes, using, as an actual switching destination output port address, a preset switching destination output port address included in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

With reference to the fifth possible implementation manner of the seventh aspect, in a sixth possible implementation manner, the determining whether the data packet meets a preset condition specifically includes:

determining whether the optical label corresponding to the data packet is correct and/or whether the corresponding preset switching destination output port address is occupied.

With reference to the seventh aspect or the first to sixth possible implementation manners of the seventh aspect, in a seventh possible implementation manner, the generating a control signal according to the optical label signal specifically includes:

using, with respect to an idle sequence, the any switching output port in the determined idle switching output port as an actual switching destination output port address of the idle sequence, and generating a control signal according to the actual switching destination output port address.

With reference to the seventh aspect or the first to seventh possible implementation manners of the seventh aspect, in an eighth possible implementation manner, the generating a control signal according to the optical label signal specifically includes:

if any two different data packets arrive at the optical switch matrix simultaneously, and preset switching destination output port addresses corresponding to the two data packets respectively are the same and unoccupied, using a preset switching destination output port address corresponding to one data packet as a first actual switching destination output port address of the data packet and using a determined idle switching output port address as a second actual switching destination output port address of the other data packet; and generating a control signal according to the first actual switching destination output port address and the second actual switching destination output port address.

With reference to the seventh aspect or the first to eighth possible implementation manners of the seventh aspect, in a ninth possible implementation manner, after the adjusting, according to the control signal, an optical switch on a link between each input port for data signal input and a corresponding output port for data signal output, to build a switching and transmission path for transmitting the continuous data signal, and before the inputting the any data signal to an optical receiving system through the switching and transmission path, the method further includes:

separately calculating a first power attenuation value after each data packet included in the continuous data signal passes through a corresponding switching and transmission path, and/or a second power attenuation value of an optical switch unit on the corresponding switching and transmission path;

calculating a total power attenuation value according to the first power attenuation value and/or the second power attenuation value; and performing power compensation before a data packet is input to the optical receiving system through a corresponding actual switching destination output port.

Beneficial effects of the present invention are as follows:

In the prior art, an optical signal transmitted by an optical transmission system is a burst data signal. In this way, a common practice of processing a burst signal by an optical receiving system is: adding a preamble before a data packet carried in each optical signal, to adjust a status of an optical receiver; however, a disadvantage of resource waste exists. An optical transmission system provided in the embodiments of the present invention includes at least one data transmission apparatus. Any data transmission apparatus is configured to: transmit an optical label signal and a continuous data signal including an idle sequence and a data packet, and transmit the transmitted optical label signal to an optical switching apparatus, so that the optical switching apparatus builds, according to the optical label signal, a switching and transmission path for transmitting the continuous data signal transmitted by the any data transmission apparatus, where any optical label carried in the optical label signal corresponds to one data packet in the data signal, and switching and transmission paths corresponding to data signals transmitted by any two different data transmission apparatuses have different output ports. This ensures that a data transmission apparatus transmits a continuous data signal, and also ensures that each optical receiving system can receive the continuous data signal. Therefore, no preamble needs to be added before a data packet carried in a to-be-processed data signal, thereby avoiding a resource waste.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The embodiments of the present invention provide an optical transmission system. In this solution, the optical transmission system includes at least one data transmission apparatus, where any data transmission apparatus is configured to: transmit an optical label signal and a continuous data signal including an idle sequence and a data packet, and transmit the transmitted optical label signal to an optical switching apparatus, so that the optical switching apparatus builds, according to the optical label signal, a switching and transmission path for transmitting the continuous data signal transmitted by the any data transmission apparatus, where any optical label carried in the optical label signal corresponds to one data packet in the data signal, and switching and transmission paths corresponding to data signals transmitted by any two different data transmission apparatuses have different output ports. This ensures that a data transmission apparatus transmits a continuous data signal, and also ensures that each optical receiving system can receive the continuous data signal. Therefore, no preamble needs to be added before a data packet carried in a to-be-processed data signal, thereby avoiding a resource waste.

The following describes exemplary implementation manners of the present invention in detail with reference to the accompanying drawings.

Embodiment 1

Figure 1A:
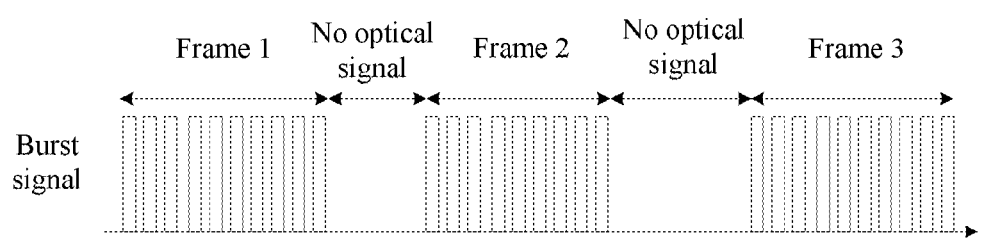
FIG. 1A is a schematic diagram of a burst signal in the prior art.
Figure 1B:
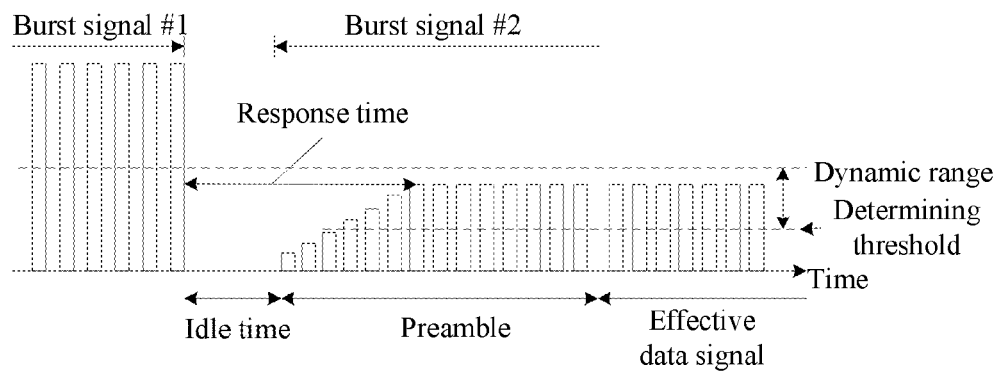
FIG. 1B is a schematic diagram of a processed burst signal in the prior art.
Figure 2A:
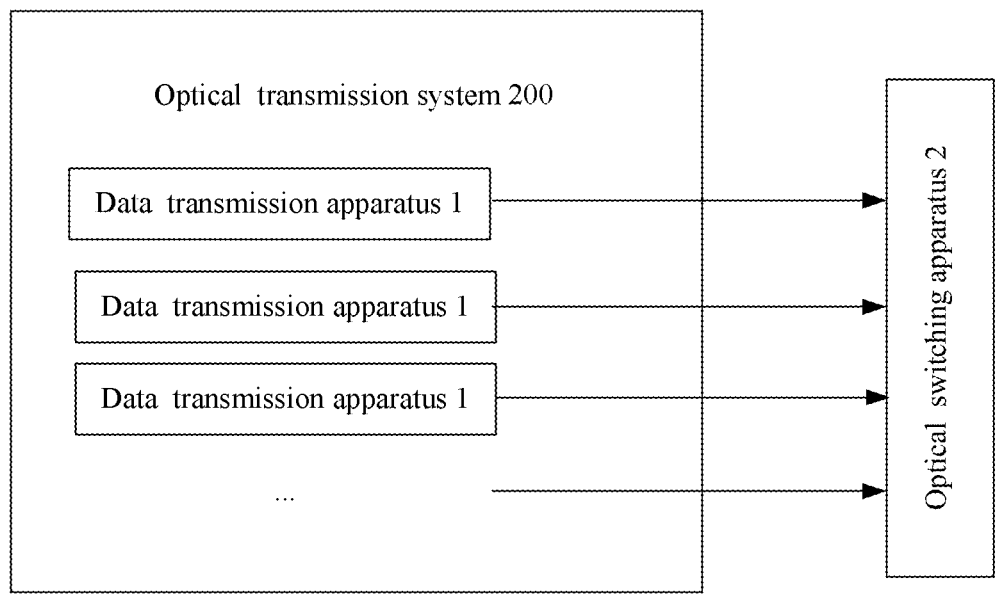
FIG. 2A is a schematic diagram of an optical transmission system according to an embodiment of the present invention.

Referring to FIG. 2A, this embodiment of the present invention provides an optical transmission system 200, where the optical transmission system 200 includes at least one data transmission apparatus 1.

Any data transmission apparatus 1 is configured to: transmit an optical label signal and a continuous data signal including an idle sequence and a data packet, and transmit the transmitted optical label signal to an optical switching apparatus 2, so that the optical switching apparatus 2 builds, according to the optical label signal, a switching and transmission path for transmitting the continuous data signal transmitted by the any data transmission apparatus 1.

Any optical label carried in the optical label signal corresponds to one data packet in the data signal, and switching and transmission paths corresponding to data signals transmitted by any two different data transmission apparatuses 1 have different output ports.

Figure 2B:
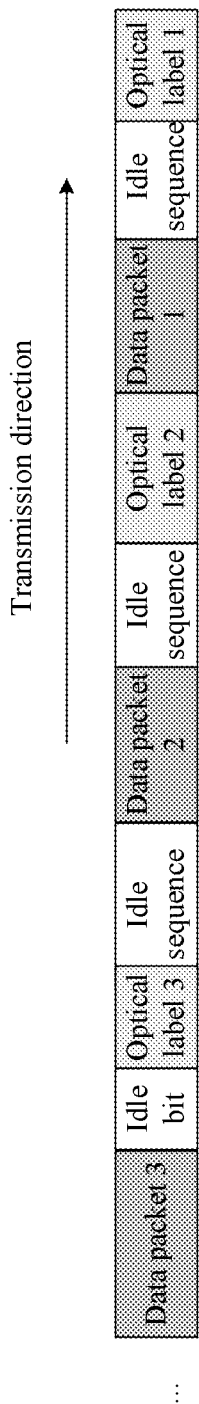
FIG. 2B is a schematic diagram of in-band transmission of a data signal and an optical label signal according to an embodiment of the present invention.

In this embodiment of the present invention, the optical label signal and the data signal are transmitted in multiple manners. Optionally, an in-band transmission mechanism may be used for transmission (that is, the optical label signal and the data signal may be transmitted through a same channel). As shown in FIG. 2B, in this transmission manner, an idle sequence is filled in between an optical label and a data packet to ensure data signal continuity. This transmission manner is used in Embodiment 2.

In this embodiment of the present invention, each optical label corresponds to one piece of data. As shown in FIG. 2B, an optical label 1 corresponds to a data packet 1, an optical label 2 corresponds to a data packet 2, and an optical label 3 corresponds to a data packet 3, regardless of whether an in-band transmission mechanism or an out-of-band transmission mechanism is used.

In this embodiment of the present invention, the optical label signal is used by the optical switching apparatus 2 to build the switching and transmission path for transmitting the continuous data signal transmitted by the any data transmission apparatus 1, that is, a specific delay exists between a time of receiving an optical label by a management and control module 21 and a time of generating a control signal to drive an optical switch matrix 22 to complete building of the switching and transmission path. Therefore, optionally, each optical label needs to be transmitted earlier than a corresponding data packet. In this way, before a data packet arrives at the optical switch matrix 22, the management and control module 21 has generated a control signal according to a corresponding optical label, and then the optical switch matrix 22 builds, according to the control signal, a switching and transmission path for data signal transmission.

Certainly, in actual application, an optical label may be transmitted together with a corresponding data packet, or a corresponding data packet is transmitted earlier than an optical label; in this case, delay control needs to be performed on the data packet, and the data packet is transmitted after the management and control module 21 generates a control signal according to the optical label and builds a transmission path.

Figure 2C:
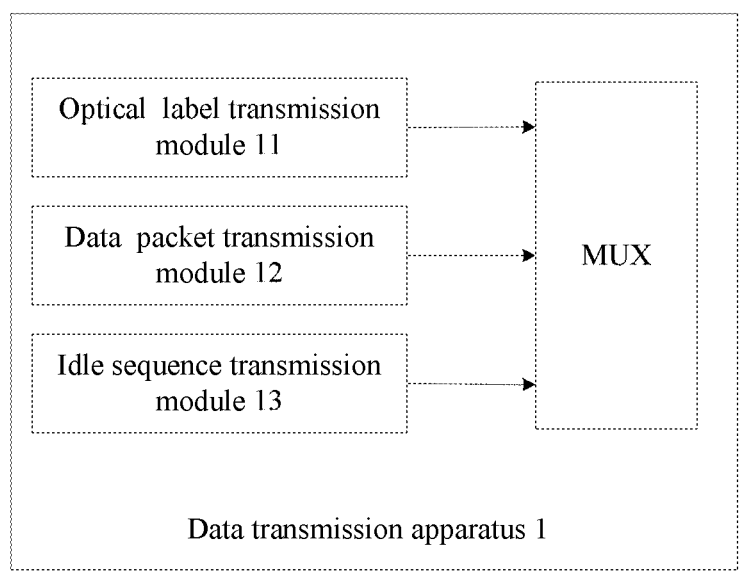
FIG. 2C is a schematic functional structure diagram of a data transmission apparatus according to an embodiment of the present invention.

As shown in FIG. 2C, in this embodiment of the present invention, any data transmission apparatus 1 includes an optical label transmission module 11, a data packet transmission module 12, and an idle sequence transmission module 13.

The optical label transmission module 11 is configured to transmit an optical label.

The data packet transmission module 12 is configured to transmit a data packet.

The idle sequence transmission module 13 is configured to transmit an idle sequence between any optical label and any data packet that are adjacent.

Figure 2D:
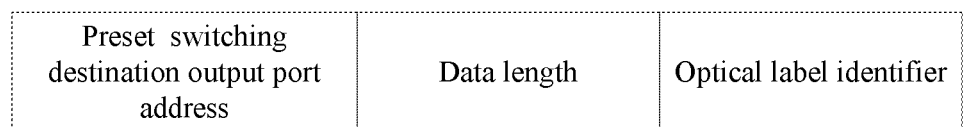
FIG. 2D is a schematic diagram of an optical label according to an embodiment of the present invention.

In this embodiment of the present invention, the optical label transmission module 11 is further configured to:

generate an optical label, where any optical label includes a preset switching destination output port address, a data length, and an optical label identifier. That is, FIG. 2D shows a form of an optical label.

The preset switching destination output port address in the optical label is used to build a switching and transmission path. The data length is used to calculate duration (that is, a validity time) of a control signal, to ensure completion of data signal transmission and switching. A function of the optical label identifier is to identify a start of an optical label signal in the management and control module 21 by using the optical label identifier.

Figure 2E:
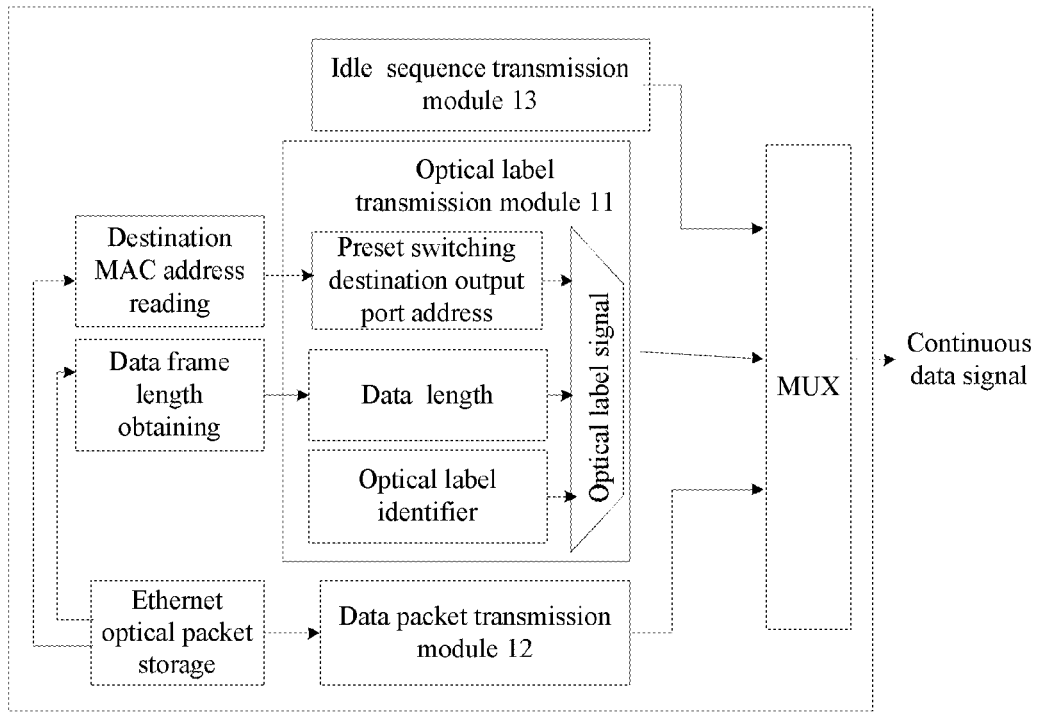
FIG. 2E is a schematic diagram of transmitting a continuous data signal according to an embodiment of the present invention.

FIG. 2E is a schematic diagram of a data transmission apparatus 1 in an in-band transmission manner. In the figure, a transmission process of the data transmission apparatus 1 is described by using two-layer Ethernet optical packet switching as an example. A data frame is stored in an Ethernet optical packet storage module before being transmitted. In this case, a destination MAC (Medium Access Control; media access control) address needs to be read from the data frame, where the destination MAC address is used to determine a preset switching destination output port address; a data frame length is read from the data frame, where the data frame length is used to determine a data length; then, an optical label is generated according to the preset switching destination output port address, the data length, and an optical label identifier.

In this embodiment of the present invention, after obtaining the destination MAC address, the management and control module 21 can obtain, by searching a table, a preset switching destination output port address corresponding to a destination port number. Table 1 shows a correspondence between a destination MAC address and a preset switching destination output port address, where each preset switching destination output port address corresponds to multiple MAC addresses.

TABLE 1

Correspondence between a destination MAC address and a preset switching destination output port address

| Destination MAC address (in hexadecimal notation) | Preset switching destination output port address (in binary notation) | Preset switching destination output port address (in decimal notation) |
|---|---|---|
| 0000 C055 0102 | 0011 0011 0011 | 1 |
| 0000 C055 0202 | | |
| 0000 C055 0302 | 0100 1101 1001 | 2 |
| 0000 C055 0402 | | |
| 0000 C055 0502 | 1001 0011 1100 | 3 |
| 0000 C055 0602 | | |
| 0000 C055 0702 | 1100 1101 0010 | 4 |
| 0000 C055 0802 | | |

Figure 3A:
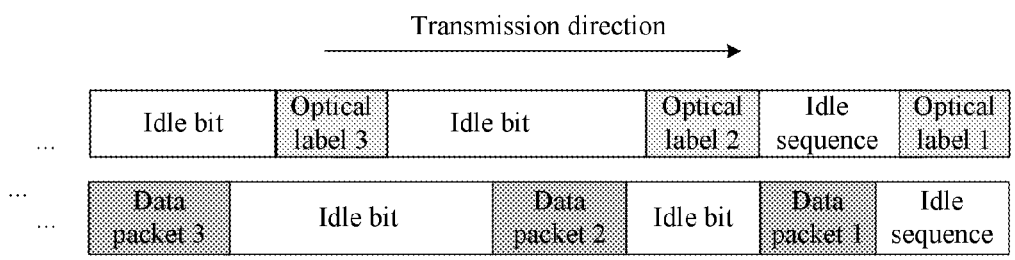
FIG. 3A is a schematic diagram of out-of-band transmission of a data signal and an optical label signal according to an embodiment of the present invention.

The data transmission apparatus 1 included in the optical transmission system provided in Embodiment 1 transmits both the optical label signal and the data signal. In actual application, the optical label signal and the data signal may be transmitted by different devices, or may be transmitted by using an out-of-band transmission mechanism (that is, the optical label signal and the data signal may be transmitted through different channels). As shown in FIG. 3A, when an optical label signal is transmitted by using an out-of-band transmission mechanism, an idle sequence is transmitted when no data is transmitted through a data signal transmission channel. On an optical label signal transmission link, an idle sequence or no idle sequence may be transmitted between optical label signals, as shown in Embodiment 2.

Embodiment 2

Figure 3B:
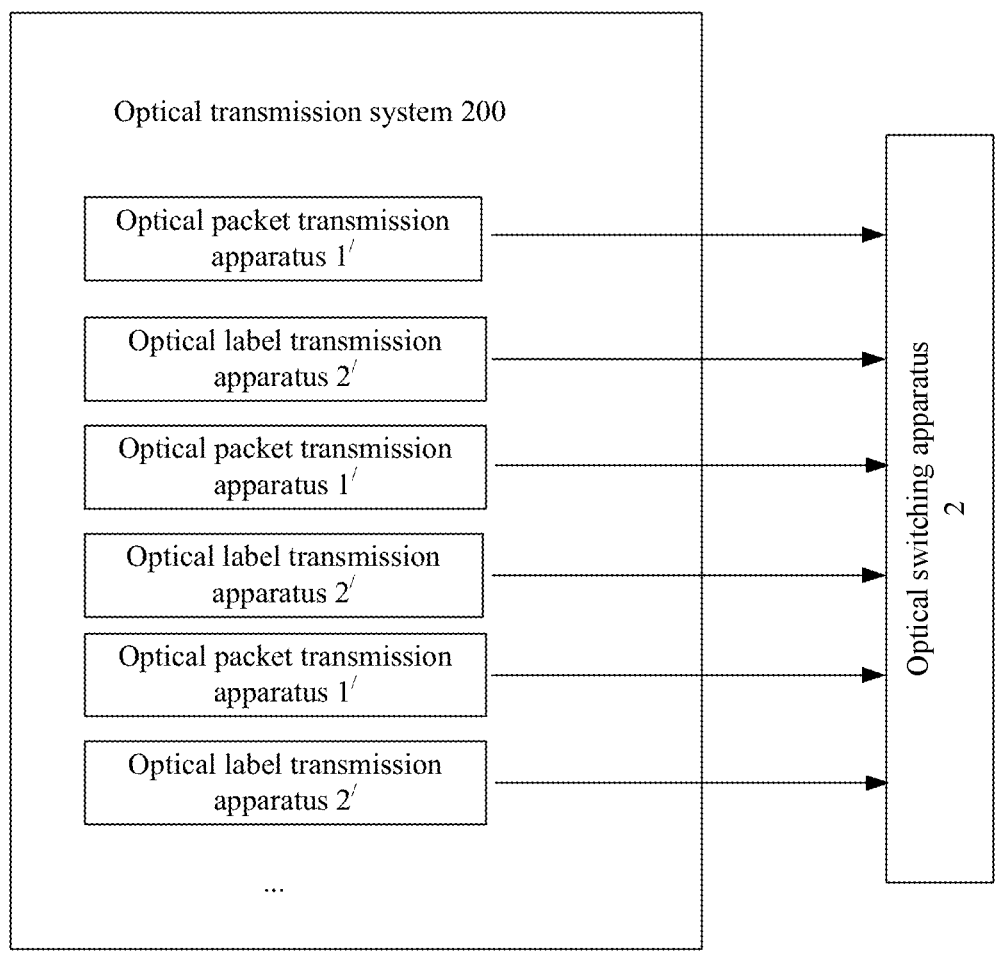
FIG. 3B is a schematic diagram of another optical transmission system according to an embodiment of the present invention.

Referring to FIG. 3B, this embodiment of the present invention provides an optical transmission system 200, where the optical transmission system 200 includes at least one optical packet transmission apparatus 1′ and at least one optical label transmission apparatus 2′.

Any optical packet transmission apparatus 1′ is configured to transmit a continuous data signal including an idle sequence and a data packet.

Any optical label transmission apparatus 2′ is configured to: transmit an optical label signal, and transmit the optical label signal to an optical switching apparatus 2, so that the optical switching apparatus 2 builds, according to the optical label signal, a switching and transmission path for transmitting a continuous data signal transmitted by a corresponding optical packet transmission apparatus 1′.

Any optical label carried in the optical label signal corresponds to one data packet in the corresponding data signal, and switching and transmission paths corresponding to data signals transmitted by any two different optical packet transmission apparatuses 1′ have different output ports.

Figure 3C:
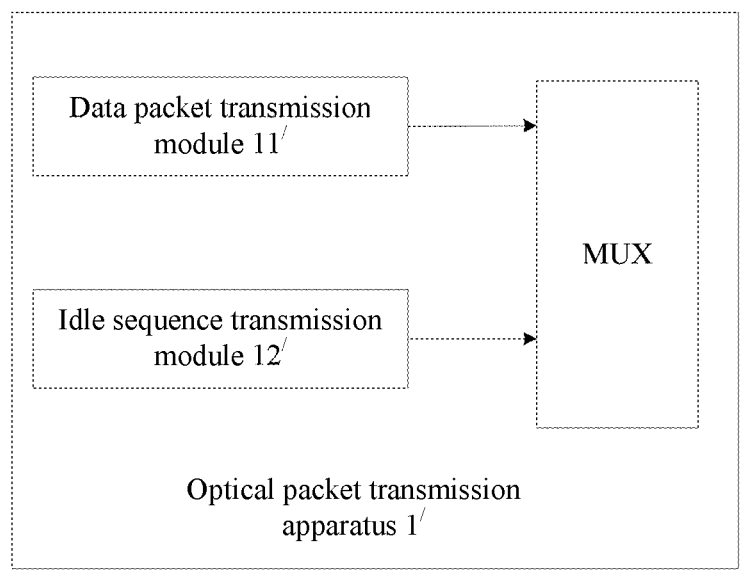
FIG. 3C is a schematic diagram of transmitting a data signal by an optical packet transmission apparatus according to an embodiment of the present invention.

As shown in FIG. 3C, in this embodiment of the present invention, any optical packet transmission apparatus 1′ includes a data packet transmission module 11′ and an idle sequence transmission module 12′.

The data packet transmission module 11′ is configured to transmit a data packet.

The idle sequence transmission module 12′ is configured to transmit an idle sequence between any two adjacent data packets.

Further, in this embodiment of the present invention, the optical label transmission module 2′ is further configured to:

generate an optical label, where any optical label includes a preset switching destination output port address, a data length, and an optical label identifier.

Embodiment 3

Figure 4A:
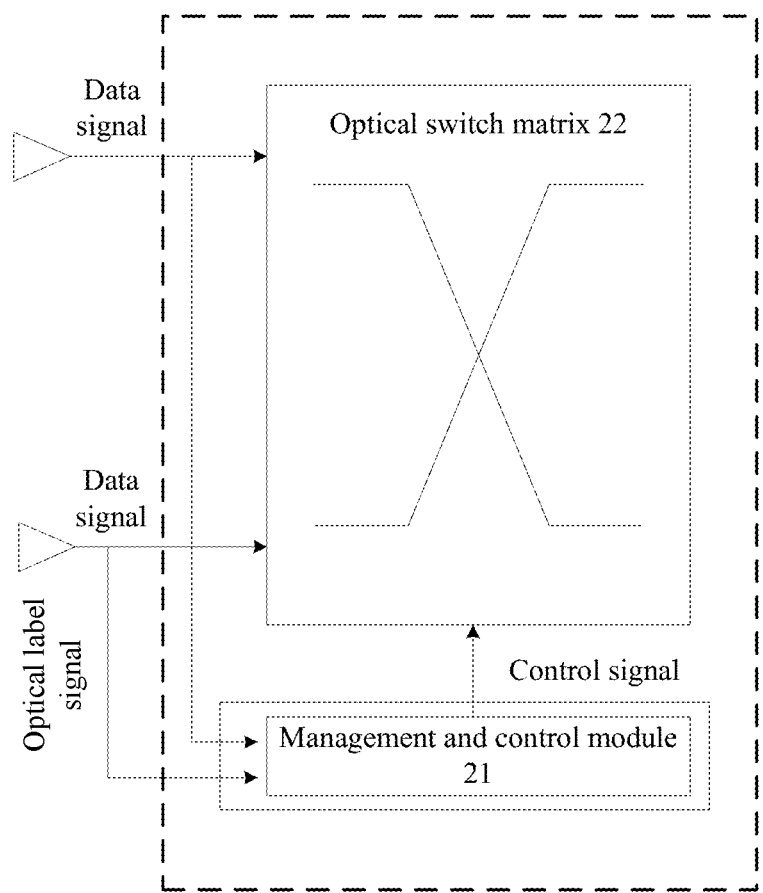
FIG. 4A is a schematic diagram of an optical switching apparatus according to an embodiment of the present invention.

Referring to FIG. 4A, this embodiment of the present invention further provides an optical switching apparatus 2, including a management and control module 21 and an optical switch matrix 22.

The management and control module 21 is configured to: receive an optical label signal transmitted by an optical transmission system 200, and transmit, to the optical switch matrix 22, a control signal generated according to the optical label signal.

The optical switch matrix 22 is configured to: receive a continuous data signal transmitted by the optical transmission system 200 and the control signal; adjust, according to the control signal, an optical switch unit on a link between each input port for data signal input and a corresponding output port for data signal output, to build a switching and transmission path for transmitting the continuous data signal; and input any data signal to an optical receiving system 500 through the switching and transmission path.

Any two different switching and transmission paths have different input ports and output ports.

If the optical transmission system 200 transmits the data signal and the optical label signal by using an in-band transmission mechanism, optionally, 10% of a signal may be extracted to generate a control signal. After receiving the optical label signal, the management and control module 21 determines a location of an optical label by using an optical label identifier, then extracts a preset switching destination output port address from the optical label to generate an actual switching destination output port address, and extracts data length information to generate duration of the control signal.

Figure 4B:
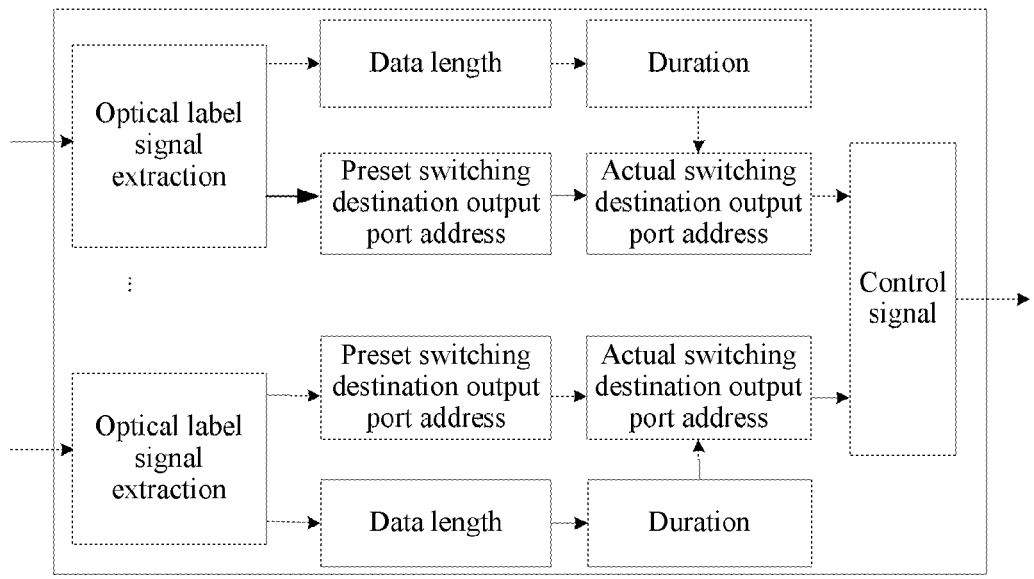
FIG. 4B is a schematic diagram of a processing process of generating a control signal according to an embodiment of the present invention.

In this embodiment of the present invention, FIG. 4B shows a processing process of generating a control signal by the optical switching apparatus 2.

In this embodiment of the of present invention, each optical label carried in the optical label signal received by the management and control module 21 includes a preset switching destination output port address, a data length, and an optical label identifier.

Optionally, in this embodiment of the present invention, the management and control module 21 is specifically configured to:

determine, according to a preset switching destination output port address included in a corresponding optical label, an actual switching destination output port address corresponding to each data packet carried in a continuous data signal;

allocate, for each idle sequence, an output port address corresponding to an idle output port, and use the output port address as an actual switching destination output port address corresponding to the idle sequence; and perform the following operations separately with respect to any data packet and any idle sequence:

generating, according to an input port address and an actual switching destination output port address, a control signal for controlling a switch unit on a link between an input port corresponding to the input port address and an output port corresponding to the actual switching destination output port address; and transmitting the generated control signal to the optical switch matrix 22.

Further, in this embodiment of the present invention, the management and control module 21 is further configured to:

calculate, with respect to any optical label in the received optical label signal and according to a data packet length included in the any optical label, a time required for transmitting a corresponding data packet; and determine, according to the time, a validity time of a control signal for controlling a switching and transmission path for the data packet corresponding to the optical label.

In this embodiment of the present invention, a process of generating an actual switching destination output port address is as follows:

Step a: Set, to m, a preset switching destination output port port_num_1 corresponding to a preset switching destination output port address.

In this step, whether a bit error occurs on an optical label is first determined, and if the error occurs, an unoccupied output port is used as an actual switching destination output port for a data packet corresponding to the optical label, or if no error occurs, step b is performed.

Step b: Determine a status path_state of the preset switching destination output port m; and if the path_state is 1, perform step c; otherwise, perform step d.

Step c: If the path_state is 1, which indicates that the preset switching destination output port m is occupied, set the port_num_1 to 0.

Step d: If the path_state is 0, which indicates that the preset switching destination output port m is unoccupied, set the path_state of the preset switching destination output port m to 1.

In this step, an actual switching destination output port address of a data signal corresponding to a preset switching destination output port address is the preset switching destination output port address; an input port is connected to an actual switching destination output port, so as to build a switching and transmission path. That is, the corresponding data signal is input to the optical receiving system 500 through the preset switching destination output port.

Step e: A counter build_time starts counting when a switching and transmission path starts to be built; when a numerical value on the counter build_time is equal to duration of a control signal, which indicates that a validity time of the switching and transmission path expires, set both the port_num_1 and the path_state of the output port m to 0, and release the link.

According to the foregoing process, an actual switching destination output port address corresponding to each data signal is determined, and after the actual switching destination output port address corresponding to each data signal is determined, a corresponding control signal can be generated by searching a table. Table 2 shows a correspondence between a control signal and an actual switching destination output port address by using a control signal for a 4×4 banyan optical switch matrix 22. In actual application, the actual switching destination output port address may be not stored.

TABLE 2

| Correspondence between a preset switching destination output port address and a control signal | | | | | | | | |
|---|---|---|---|---|---|---|---|---|
| Preset switching destination output port address | | | | Actual switching destination output port address | | | | Control signal |
| 1 | 2 | 3 | 0 | 1 | 2 | 3 | 4 | xxxx xxxx xxxx xxxx |
| 2 | 0 | 1 | 3 | 2 | 4 | 1 | 3 | xxxx xxxx xxxx xxxx |
| 1 | 2 | 3 | 4 | 1 | 2 | 3 | 4 | xxxx xxxx xxxx xxxx |

Optionally, in this embodiment of the present invention, the optical switch matrix 22 is specifically configured to:

perform the following operations separately with respect to a control signal corresponding to any data signal:

controlling a switch unit on a link between an input port and an actual switching destination output port that are corresponding to the data signal, and connecting the input port to the actual switching destination output port to build a switching and transmission path for transmitting the any data signal; and inputting the any data signal to the optical receiving system 500 through the switching and transmission path.

Optionally, in this embodiment of the present invention, the management and control module 21 is specifically configured to:

perform the following operations separately with respect to a data packet corresponding to any optical label:

determining whether the data packet meets a preset condition; and if yes, using, as an actual switching destination output port address, a preset switching destination output port address included in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

In this embodiment of the present invention, the determining, by the management and control module 21, whether the any data packet meets a preset condition is specifically:

determining whether the optical label corresponding to the data packet is correct and/or whether the corresponding preset switching destination output port address is occupied.

Optionally, in this embodiment of the present invention, the management and control module 21 is specifically configured to:

use, with respect to an idle sequence, the any switching output port in the determined idle switching output port as an actual switching destination output port address of the idle sequence, and generate a control signal according to the actual switching destination output port address.

In actual application, a preset switching destination output port corresponding to a data signal may have been occupied; in this case, to ensure that data signal transmission is performed on an idle switching destination output port all the time and further ensure data signal transmission continuity, in this embodiment of the present invention, optionally, the management and control module 21 is specifically configured to:

if any two different data packets arrive at the optical switch matrix 22 simultaneously, and preset switching destination output port addresses corresponding to the two data packets respectively are the same and unoccupied, use a preset switching destination output port address corresponding to one data packet as a first actual switching destination output port address of the data packet and use a determined idle switching output port address as a second actual switching destination output port address of the other data packet; and generate a control signal according to the first actual switching destination output port address and the second actual switching destination output port address.

In this way, even if a data signal cannot be switched to a preset switching destination output port (the preset switching destination output port is occupied), the data signal can be switched to another idle switching destination output port, to maintain data signal transmission continuity. Therefore, data signal output is performed on each switching destination output port all the time regardless of a switching manner.

For example, it is assumed that there are totally four switching destination input ports and four switching destination output ports, where switching destination output ports 1, 2, and 3 are all occupied, and a switching destination output port 4 is idle. In this case, if a preset switching destination output port generated for a fourth data signal is the switching destination output port 3, but the switching destination output port 3 has been occupied currently, the fourth data signal is switched to the switching destination output port 4 instead of being discarded. That is, a corresponding actual switching destination output port passed through by the fourth data signal is the switching destination output port 4; the fourth data signal is input to the optical receiving system 500 through the switching destination output port 4. Because a control signal corresponding to "1230" and a control signal corresponding to "1234" are the same, the management and control module 21 searches, according to "1230", the table to generate the control signal. Therefore, data signal transmission continuity at the switching destination output ports is ensured.

Figure 4C:
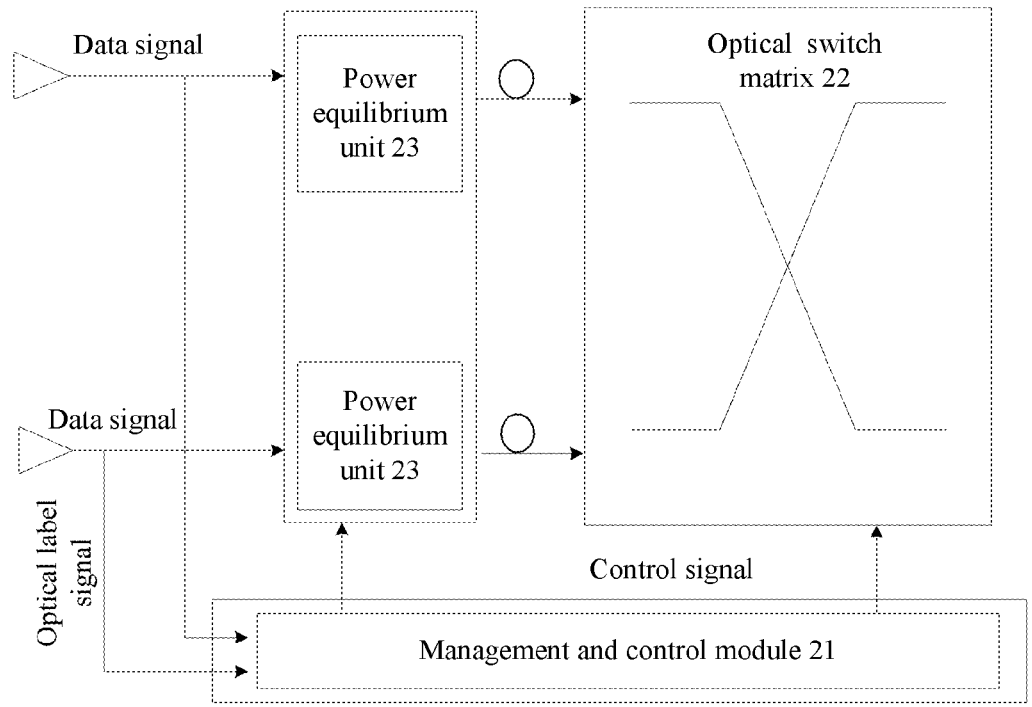
FIG. 4C is another schematic diagram of an optical switching apparatus according to an embodiment of the present invention.

In this embodiment of the present invention, in some optical switching systems, different optical transmission systems 200 usually have different transmission power, and a different interactive transmission path through which a data signal passes in the optical switch matrix 22 results in a different transmission loss. In this case, data signals received through a same switching destination output port from different data transmission apparatuses 1 or optical packet transmission apparatuses 1' have different power. Due to such a difference between the data signals, the optical receiving system 500 needs to receive the data signals by using a burst-mode optical-to-electrical conversion device. In this way, the problem in the background still exists. To avoid the problem in the background, in this embodiment of the present invention, further referring to FIG. 4C, a power equilibrium unit 23 is further included and configured to perform power compensation before a data packet is input to the optical receiving system through a corresponding actual switching destination output port.

Figure 4D:
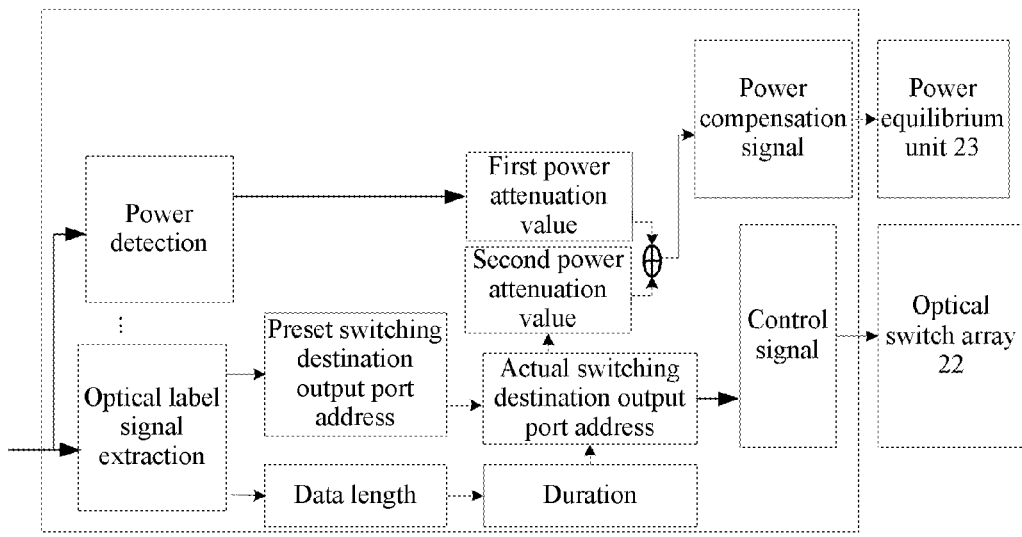
FIG. 4D is a schematic diagram of generating a signal by a management and control module according to an embodiment of the present invention.

As shown in FIG. 4D, in this embodiment of the present invention, the management and control module 21 is further configured to:

separately calculate a first power attenuation value after each data packet included in the continuous data signal passes through a corresponding switching and transmission path, and/or a second power attenuation value of an optical switch unit on the corresponding switching and transmission path; and calculate a total power attenuation value according to the first power attenuation value and/or the second power attenuation value, and transmit the total power attenuation value to the power equilibrium unit 23, so that the power equilibrium unit 23 performs power compensation before a data packet is input to the optical receiving system 500 through a corresponding actual switching destination output port.

The first power attenuation value is used to compensate for a transmission loss in the switching and transmission path. The second power attenuation value is mainly used to compensate for a loss in the optical switch matrix 22. The loss in the optical switch matrix 22 is constant and is related to an interactive transmission path for data signal transmission. Therefore, a value of the loss in the optical switch matrix 22 may be determined according to the generated control signal, that is, after an actual switching destination output port address is generated, the second power attenuation value is generated by searching the table.

In this embodiment of the present invention, the first power attenuation value and the second power attenuation value are added to obtain a power value that needs to be compensated for a data signal transmitted through each transmission path. In an implementation process, power compensation may be performed by selecting a proper amplifier according to a type of a data signal transferred through a switching and transmission path. For example, in an amplifier array, SOAs (Semiconductor Optical Amplifier, semiconductor optical amplifier), burst-mode EDFAs (Erbium-doped Fiber Amplifier, erbium-doped fiber amplifier), or the like may be used.

Further, when the second power attenuation value is relatively small, the second power attenuation value may be omitted and only the first power attenuation value is considered. In this case, because the data transmission apparatus 1 transmits a continuous data signal, the power equilibrium unit 23 may perform power compensation by using a continuous amplification apparatus, further reducing system complexity and reducing costs.

Embodiment 4

Figure 5:
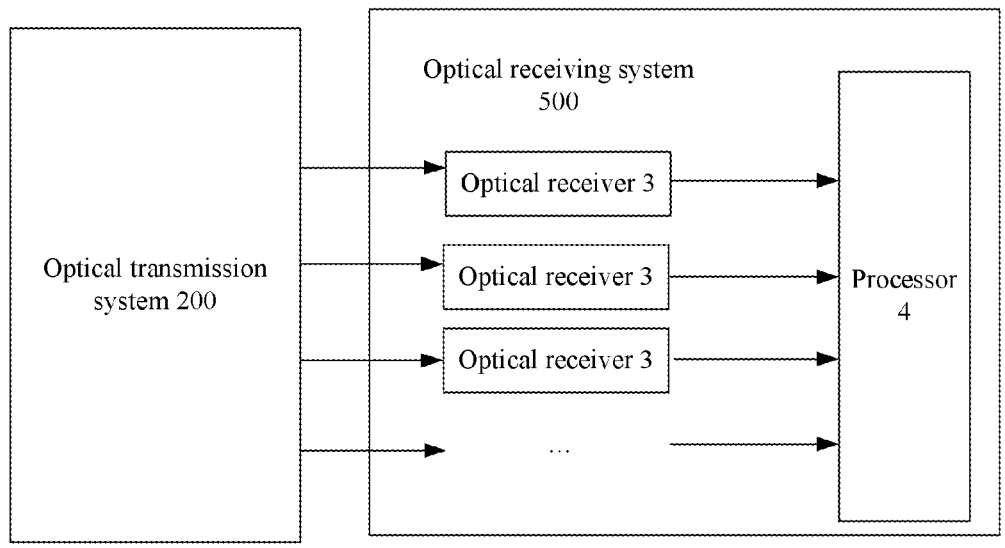
FIG. 5 is a schematic diagram of an optical receiving system according to an embodiment of the present invention.

In this embodiment of the present invention, as shown in FIG. 5, an optical receiving system 500 is further provided, including an optical receiver 3 and a processor 4.

Each optical receiver 3 is configured to receive a continuous data signal transmitted by an optical transmission system 200.

The processor 4 is configured to process a data packet in the received continuous data signal.

Figure 6:
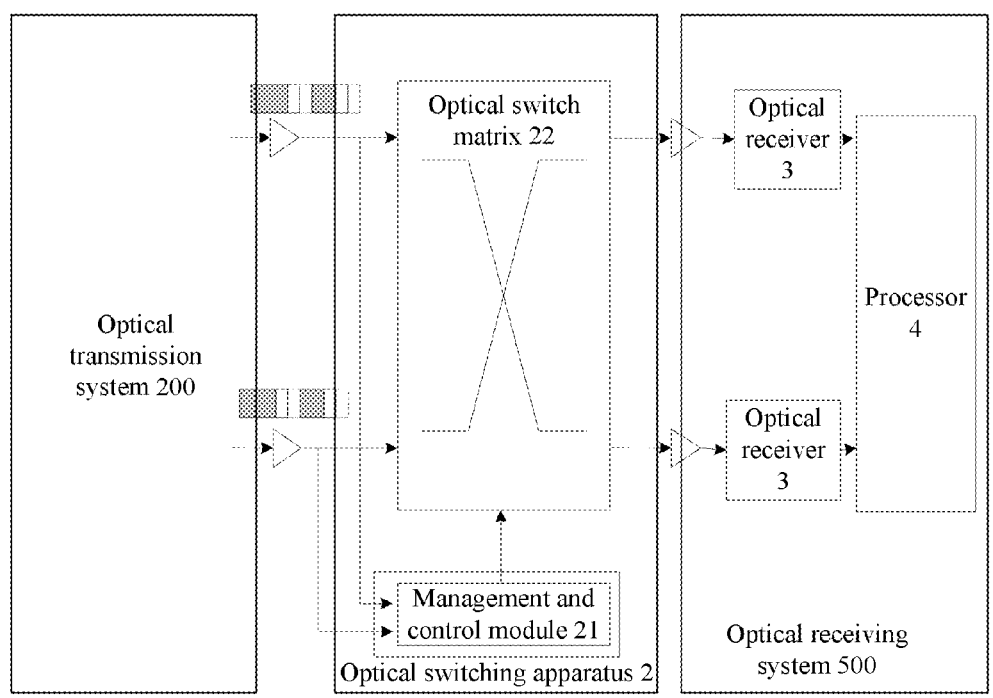
FIG. 6 is a schematic diagram of an optical switching system according to an embodiment of the present invention.

In this embodiment of the present invention, as shown in FIG. 6, an optical switching system is further provided, including:

the optical transmission system 200 in FIG. 2A or FIG. 3B, the optical switching apparatus 2 shown in FIG. 4A, and the optical receiving system 500 shown in FIG. 5.

Figure 7:
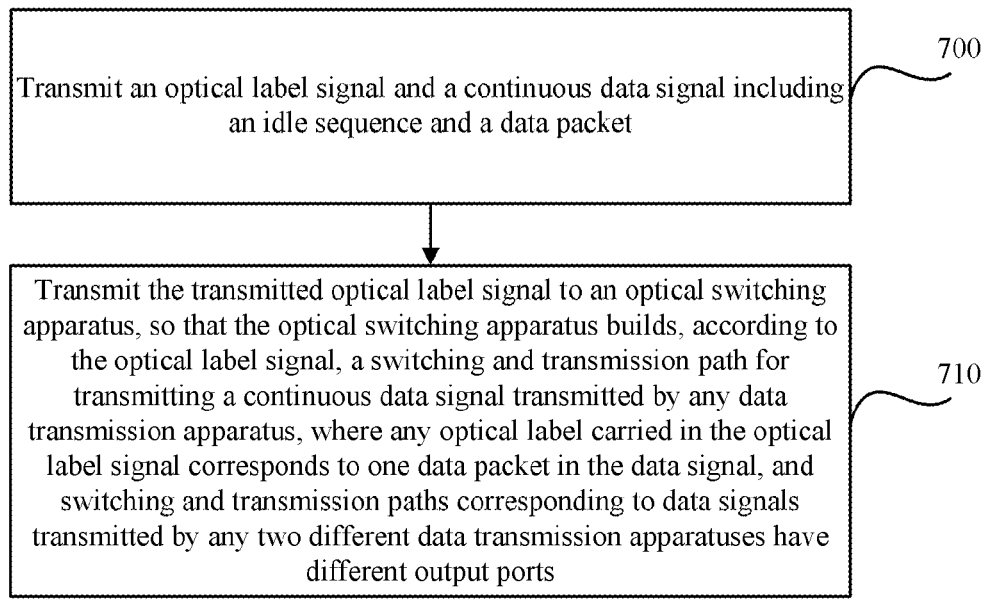
FIG. 7 is a flowchart of transmitting light by an optical transmission system according to an embodiment of the present invention.

As shown in FIG. 7, an embodiment of the present invention further provides a method for transmitting light by an optical transmission system, where a detailed process of the method is as follows:

Step 700: Transmit an optical label signal and a continuous data signal including an idle sequence and a data packet.

Step 710: Transmit the transmitted optical label signal to an optical switching apparatus, so that the optical switching apparatus builds, according to the optical label signal, a switching and transmission path for transmitting a continuous data signal transmitted by any data transmission apparatus, where any optical label carried in the optical label signal corresponds to one data packet in the data signal, and switching and transmission paths corresponding to data signals transmitted by any two different data transmission apparatuses have different output ports.

In this embodiment of the present invention, optionally, if the optical label signal and the continuous data signal are transmitted in an in-band transmission manner, an idle sequence is between any optical label and an adjacent data packet; or if the optical label signal and the continuous data signal are transmitted in an out-of-band transmission manner, an idle sequence is between any two adjacent data packets.

Further, in this embodiment of the present invention, before the transmitting an optical label signal, the method further includes:

generating an optical label, where any optical label includes a preset switching destination output port address, a data length, and an optical label identifier.

Figure 8:
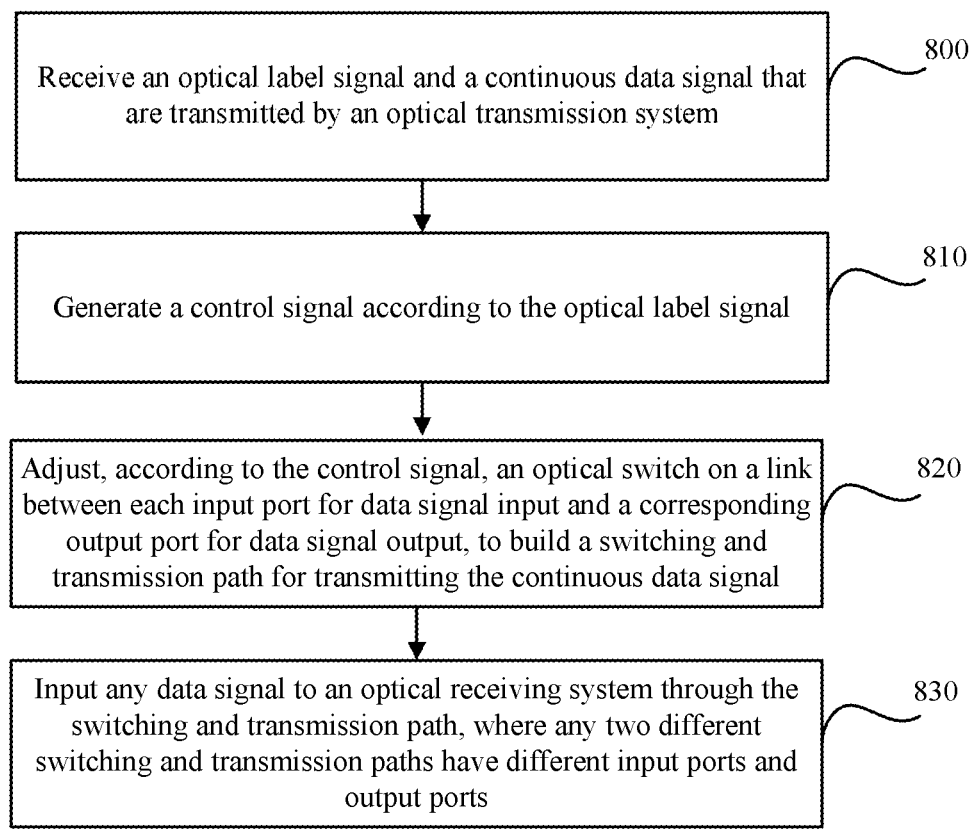
FIG. 8 is another flowchart of transmitting light by an optical transmission system according to an embodiment of the present invention.

As shown in FIG. 8, an embodiment of the present invention further provides another method for transmitting light by an optical transmission system, where a detailed process of the method is as follows:

Step 800: Receive an optical label signal and a continuous data signal that are transmitted by an optical transmission system.

Step 810: Generate a control signal according to the optical label signal.

Step 820: Adjust, according to the control signal, an optical switch on a link between each input port for data signal input and a corresponding output port for data signal output, to build a switching and transmission path for transmitting the continuous data signal.

Step 830: Input any data signal to an optical receiving system through the switching and transmission path, where any two different switching and transmission paths have different input ports and output ports.

In this embodiment of the present invention, optionally, each optical label carried in the optical label signal includes a preset switching destination output port address, a data length, and an optical label identifier.

In this embodiment of the present invention, optionally, the generating a control signal according to the optical label signal specifically includes:

determining, according to a preset switching destination output port address included in a corresponding optical label, an actual switching destination output port address corresponding to each data packet carried in a continuous data signal;

allocating, for each idle sequence, an output port address corresponding to an idle output port, and using the output port address as an actual switching destination output port address corresponding to the idle sequence; and performing the following operation with respect to any data packet and any idle sequence:

generating, according to an input port address and an actual switching destination output port address, a control signal for controlling a switch unit on a link between an input port corresponding to the input port address and an output port corresponding to the actual switching destination output port address.

In this embodiment of the present invention, further, after the generating a control signal for controlling a switch unit on a link between an input port corresponding to the input port address and an output port corresponding to the actual switching destination output port address, the method further includes:

calculating, with respect to any optical label in the received optical label signal and according to a data packet length included in the any optical label, a time required for transmitting a corresponding data packet; and determining, according to the time, a validity time of a control signal for controlling a switching and transmission path for the data packet corresponding to the optical label.

In this embodiment of the present invention, optionally, the adjusting, according to the control signal, an optical switch on a link between each input port for data signal input and a corresponding output port for data signal output, to build a switching and transmission path for transmitting the continuous data signal specifically includes:

performing the following operations separately with respect to a control signal corresponding to any data signal:

controlling a switch unit on a link between an input port and an actual switching destination output port that are corresponding to the data signal, and connecting the input port to the actual switching destination output port to build a switching and transmission path for transmitting the any data signal.

In this embodiment of the present invention, optionally, the generating a control signal according to the optical label signal specifically includes:

performing the following operations separately with respect to a data packet corresponding to any optical label:

determining whether the data packet meets a preset condition; and if yes, using, as an actual switching destination output port address, a preset switching destination output port address included in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

In this embodiment of the present invention, optionally, the determining whether the data packet meets a preset condition specifically includes:

determining whether the optical label corresponding to the data packet is correct and/or whether the corresponding preset switching destination output port address is occupied.

In this embodiment of the present invention, optionally, the generating a control signal according to the optical label signal specifically includes:

using, with respect to an idle sequence, the any switching output port in the determined idle switching output port as an actual switching destination output port address of the idle sequence, and generating a control signal according to the actual switching destination output port address.

In this embodiment of the present invention, optionally, the generating a control signal according to the optical label signal specifically includes:

if any two different data packets arrive at the optical switch matrix simultaneously, and preset switching destination output port addresses corresponding to the two data packets respectively are the same and unoccupied, using a preset switching destination output port address corresponding to one data packet as a first actual switching destination output port address of the data packet and using a determined idle switching output port address as a second actual switching destination output port address of the other data packet; and generating a control signal according to the first actual switching destination output port address and the second actual switching destination output port address.

In this embodiment of the present invention, further, after the adjusting, according to the control signal, an optical switch on a link between each input port for data signal input and a corresponding output port for data signal output, to build a switching and transmission path for transmitting the continuous data signal, and before the inputting any data signal to an optical receiving system through the switching and transmission path, the method further includes:

separately calculating a first power attenuation value after each data packet included in the continuous data signal passes through a corresponding switching and transmission path, and/or a second power attenuation value of an optical switch unit on the corresponding switching and transmission path;

calculating a total power attenuation value according to the first power attenuation value and/or the second power attenuation value; and performing power compensation before a data packet is input to the optical receiving system through a corresponding actual switching destination output port.

In conclusion, the embodiments of the present invention provide an optical transmission system. In this solution, the optical transmission system includes at least one data transmission apparatus, where any data transmission apparatus is configured to: transmit an optical label signal and a continuous data signal including an idle sequence and a data packet, and transmit the transmitted optical label signal to an optical switching apparatus, so that the optical switching apparatus builds, according to the optical label signal, a switching and transmission path for transmitting the continuous data signal transmitted by the any data transmission apparatus, where any optical label carried in the optical label signal corresponds to one data packet in the data signal, and switching and transmission paths corresponding to data signals transmitted by any two different data transmission apparatuses have different output ports. This ensures that a data transmission apparatus transmits a continuous data signal, and also ensures that each optical receiving system can receive the continuous data signal. Therefore, no preamble needs to be added before a data packet carried in a to-be-processed data signal, thereby avoiding a resource waste.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An optical transmission system, comprising:
at least two data transmission apparatuses, wherein
any one of the data transmission apparatuses is configured
to: transmit an optical label signal and a continuous data signal comprising an idle sequence and a data packet, and transmit the transmitted optical label signal to an optical switching apparatus, so that the optical switching apparatus builds, according to the optical label signal, a switching and transmission path for transmitting the continuous data signal transmitted by the any one of the data transmission apparatuses, wherein any optical label carried in the optical label signal corresponds to one data packet in the data signal and comprises a preset switching destination output port address, a data length, and an optical label identifier, and switching and transmission paths corresponding to data signals transmitted by the any two different data transmission apparatuses have different output ports.

2. The optical transmission system according to claim 1, wherein any one of the data transmission apparatuses comprises an optical label transmission module, a data packet transmission module, and an idle sequence transmission module, wherein the optical label transmission module is configured to transmit an optical label;

the data packet transmission module is configured to transmit a data packet; and the idle sequence transmission module is configured to transmit an idle sequence between any optical label and any data packet that are adjacent.

3. An optical switching apparatus, comprising:
a management and control module; and
an optical switch matrix, wherein
the management and control module is configured to:
receive an optical label signal transmitted by an optical transmission system, and transmit, to the optical switch matrix, a control signal generated according to the optical label signal; and the optical switch matrix is configured to: receive a continuous data signal transmitted by the optical transmission system and the control signal; adjust, according to the control signal, an optical switch unit on a link between each input port for data signal input and a corresponding output port for data signal output, to build a switching and transmission path for transmitting the continuous data signal; and input the any data signal to an optical receiving system through the switching and transmission path, wherein any two different switching and transmission paths have different input ports and output ports, wherein each optical label carried in the optical label signal received by the management and control module comprises a preset switching destination output port address, a data length, and an optical label identifier.

4. The optical switching apparatus according to claim 3, wherein the management and control module is specifically configured to:

determine, according to the preset switching destination output port address comprised in a corresponding optical label, an actual switching destination output port address corresponding to each data packet carried in a continuous data signal;

allocate, for each idle sequence, an output port address corresponding to an idle output port, and use the output port address as an actual switching destination output port address corresponding to the idle sequence; and perform the following operations separately with respect to any data packet and any idle sequence:

generating, according to an input port address and an actual switching destination output port address, a control signal for controlling a switch unit on a link between an input port corresponding to the input port address and an output port corresponding to the actual switching destination output port address; and transmitting the generated control signal to the optical switch matrix.

5. The optical switching apparatus according to claim 4, wherein the management and control module is further configured to:

calculate, with respect to any optical label in the received optical label signal and according to a data packet length comprised in the any optical label, a time required for transmitting a corresponding data packet; and determine, according to the time, a validity time of a control signal for controlling a switching and transmission path for the data packet corresponding to the optical label.

6. The optical switching apparatus according to claim 3, wherein the optical switch matrix is specifically configured to:

perform the following operations separately with respect to a control signal corresponding to any data signal:

controlling a switch unit on a link between an input port and an actual switching destination output port that are corresponding to the data signal, and connecting the input port to the actual switching destination output port to build a switching and transmission path for transmitting the any data signal; and inputting the any data signal to the optical receiving system through the switching and transmission path.

7. The optical switching apparatus according to claim 3, wherein the management and control module is specifically configured to:

perform the following operations separately with respect to a data packet corresponding to any optical label:

determining whether the data packet meets a preset condition; and if yes, using, as an actual switching destination output port address, the preset switching destination output port address comprised in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

8. The optical switching apparatus according to claim 7, wherein the determining, by the management and control module, whether the any data packet meets a preset condition is specifically:

determining whether the optical label corresponding to the data packet is correct and/or whether the corresponding preset switching destination output port address is occupied.

9. The optical switching apparatus according to claim 7, wherein the management and control module is specifically configured to:

use, with respect to an idle sequence, the any switching output port in the determined idle switching output port as an actual switching destination output port address of the idle sequence, and generate a control signal according to the actual switching destination output port address.

10. The optical switching apparatus according to claim 7, wherein the management and control module is specifically configured to:

if any two different data packets arrive at the optical switch matrix simultaneously, and preset switching destination output port addresses corresponding to the two data packets respectively are the same and unoccupied, use the preset switching destination output port address corresponding to one data packet as a first actual switching destination output port address of the data packet and use a determined idle switching output port address as a second actual switching destination output port address of the other data packet; and generate a control signal according to the first actual switching destination output port address and the second actual switching destination output port address.

11. The optical switching apparatus according to claim 3, wherein the management and control module is further configured to:

separately calculate a first power attenuation value after each data packet comprised in the continuous data signal passes through a corresponding switching and transmission path, and/or a second power attenuation value of an optical switch unit on the corresponding switching and transmission path; and calculate a total power attenuation value according to the first power attenuation value and/or the second power attenuation value, and transmit the total power attenuation value to a power equilibrium unit, so that the power equilibrium unit performs power compensation before a data packet is input to the optical receiving system through a corresponding actual switching destination output port.

12. The optical switching apparatus according to claim 11, further comprising the power equilibrium unit, configured to perform power compensation before a data packet is input to the optical receiving system through a corresponding actual switching destination output port.

13. A control method, comprising:

receiving an optical label signal and a continuous data signal that are transmitted by an optical transmission system;

generating a control signal according to the optical label signal;

adjusting, according to the control signal, an optical switch on a link between each input port for data signal input and a corresponding output port for data signal output, to build a switching and transmission path for transmitting the continuous data signal; and inputting the any data signal to an optical receiving system through the switching and transmission path, wherein any two different switching and transmission paths have different input ports and output ports, wherein each optical label carried in the optical label signal comprises a preset switching destination output port address, a data length, and an optical label identifier.

14. The method according to claim 13, wherein the generating a control signal according to the optical label signal specifically comprises:

determining, according to the preset switching destination output port address comprised in a corresponding optical label, an actual switching destination output port address corresponding to each data packet carried in a continuous data signal;

allocating, for each idle sequence, an output port address corresponding to an idle output port, and using the output port address as an actual switching destination output port address corresponding to the idle sequence; and performing the following operation with respect to any data packet and any idle sequence:

generating, according to an input port address and an actual switching destination output port address, a control signal for controlling a switch unit on a link between an input port corresponding to the input port address and an output port corresponding to the actual switching destination output port address.

15. The method according to claim 13, wherein the generating a control signal according to the optical label signal specifically comprises:

performing the following operations separately with respect to a data packet corresponding to any optical label:

determining whether the data packet meets a preset condition; and if yes, using, as an actual switching destination output port address, the preset switching destination output port address comprised in the optical label corresponding to the data packet, and generating a control signal according to the actual switching destination output port address; otherwise, determining an idle switching output port, using any switching output port in the idle switching output port as an actual switching destination output port address, and generating a control signal according to the actual switching destination output port address.

16. The method according to claim 13, wherein the generating a control signal according to the optical label signal specifically comprises:

if any two different data packets arrive at the optical switch matrix simultaneously, and preset switching destination output port addresses corresponding to the two data packets respectively are the same and unoccupied, using the preset switching destination output port address corresponding to one data packet as a first actual switching destination output port address of the data packet and using a determined idle switching output port address as a second actual switching destination output port address of the other data packet; and generating a control signal according to the first actual switching destination output port address and the second actual switching destination output port address.

17. The method according to claim 13, after the adjusting, according to the control signal, an optical switch on a link between each input port for data signal input and a corresponding output port for data signal output, to build a switching and transmission path for transmitting the continuous data signal, and before the inputting the any data signal to an optical receiving system through the switching and transmission path, further comprising:

separately calculating a first power attenuation value after each data packet comprised in the continuous data signal passes through a corresponding switching and transmission path, and/or a second power attenuation value of an optical switch unit on the corresponding switching and transmission path;

calculating a total power attenuation value according to the first power attenuation value and/or the second power attenuation value; and performing power compensation before a data packet is input to the optical receiving system through a corresponding actual switching destination output port.

* * * * *